(12) United States Patent
Chatterjee et al.

(10) Patent No.: US 12,174,385 B2
(45) Date of Patent: Dec. 24, 2024

(54) TIR PRISMS AND USE OF BACKLIGHT FOR LCoS MICRODISPLAY ILLUMINATION

(71) Applicant: Microsoft Technology Licensing, LLC, Redmond, WA (US)

(72) Inventors: Ishan Chatterjee, Seattle, WA (US); Dmitry Reshidko, Redmond, WA (US); Bernard Charles Kress, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/330,448

(22) Filed: Jun. 7, 2023

(65) Prior Publication Data

US 2023/0314816 A1 Oct. 5, 2023

Related U.S. Application Data

(62) Division of application No. 17/580,421, filed on Jan. 20, 2022, now Pat. No. 11,693,248.

(51) Int. Cl.
*G02B 27/01* (2006.01)
*F21V 8/00* (2006.01)
*G02F 1/1362* (2006.01)

(52) U.S. Cl.
CPC ......... *G02B 27/0172* (2013.01); *G02B 6/005* (2013.01); *G02B 6/0073* (2013.01); *G02F 1/136277* (2013.01)

(58) Field of Classification Search
CPC ................................................. G02B 27/0172
See application file for complete search history.

(56) References Cited

U.S. PATENT DOCUMENTS

| | | | |
|---|---|---|---|
| 7,072,096 B2 | 7/2006 | Holman et al. | |
| 8,917,962 B1 | 12/2014 | Nichol et al. | |
| 10,393,943 B2 | 8/2019 | Van Putten et al. | |
| 10,425,635 B2 | 9/2019 | Woodgate et al. | |
| 2007/0279727 A1 | 12/2007 | Gandhi et al. | |
| 2007/0296921 A1* | 12/2007 | Wang ................. | G03B 21/2073 353/20 |
| 2018/0322845 A1* | 11/2018 | Machida ............ | G02B 27/0172 |

(Continued)

FOREIGN PATENT DOCUMENTS

| WO | 2011145031 A2 | 11/2011 |
|---|---|---|
| WO | 2015179455 A2 | 11/2015 |

OTHER PUBLICATIONS

"International Search Report and Written Opinion Issued in PCT Application No. PCT/US22/048140", Mailed Date: Feb. 14, 2023, 10 Pages.

*Primary Examiner* — Edmond C Lau
(74) *Attorney, Agent, or Firm* — Mark K. Young; Mark Young PC

(57) ABSTRACT

A display engine adapted for use in a head-mounted display (HMD) device includes a reflective liquid crystal on silicon (LCoS) spatial light modulator (SLM) that is illuminated using a backlight illumination module and a pair of optical prisms providing a total internal reflection (TIR) function. In an illustrative mixed-reality embodiment, the TIR prism pair guides light to the LCoS SLM from the backlight illumination module and projects virtual images reflected from the LCoS SLM, through projection optics, to a diffractive waveguide combiner for viewing by an HMD user.

6 Claims, 14 Drawing Sheets

(56) References Cited

U.S. PATENT DOCUMENTS

| | | |
|---|---|---|
| 2018/0359461 A1 | 12/2018 | Koerber et al. |
| 2021/0124247 A1* | 4/2021 | Mezouari .......... G02F 1/133605 |
| 2022/0276499 A1* | 9/2022 | Wang .................. G02B 5/1814 |

* cited by examiner

1400 ns used to illuminate an LCoS SLM microdisplay;

TIR PRISMS AND USE OF BACKLIGHT FOR LCoS MICRODISPLAY ILLUMINATION

CROSS REFERENCE TO RELATED APPLICATIONS

This application claims priority to U.S. patent application Ser. No. 17/580,421, filed Jan. 20, 2022, entitled "TIR PRISMS AND USE OF BACKLIGHT FOR LCOS MICRODISPLAY ILLUMINATION", the entirety of which is hereby incorporated herein by references for all purposes.

BACKGROUND

Mixed-reality computing devices, such as head-mounted display (HMD) devices may be configured to display information to a user about virtual objects and/or real objects in a field of view. For example, an HMD device may be configured to display, using a see-through display system, virtual environments with real-world objects mixed in, or real-world environments with virtual objects mixed in.

SUMMARY

A display engine adapted for use in an HMD device includes a reflective liquid crystal on silicon (LCoS) spatial light modulator (SLM) that is illuminated using a backlight illumination module and a pair of optical prisms providing a total internal reflection (TIR) function. In an illustrative mixed-reality embodiment, the TIR prism pair guides light to the LCoS SLM from the backlight illumination module and projects virtual images reflected from the LCoS SLM, through projection optics, to a waveguide combiner for viewing by an HMD user.

A first illustrative embodiment of the backlight illumination module includes an edge-lit diffuser that includes a beam expander having a microstructured line formed in the diffuser substrate that includes alternating ejector and flow line segments that form a series of small notches that slice incoming light into alternating strips of light and shadow. The diffuser includes a quarter wave retarder and reflector that are arranged to recycle light in an unwanted polarization state to convert shadow strips into light strips to thereby double the number of light strips with a suitable polarization. In addition, the diffuser provides a relatively large emitting area, and the ejectors maintain emission of light over a desired cone angle to provide uniform illumination of the LCoS SLM.

A second illustrative embodiment of the backlight illumination module includes a spatial array of miniature LEDs (light-emitting diodes). Beam-shaping elements may be utilized with the LED array including, for example, a microlens array, or an array of compound parabolic concentrators, to maintain a suitable cone angle for light emission and provide uniform illumination of the LCoS SLM.

The present display engine has reduced size and weight compared to conventional arrangements which is advantageous for wearing comfort in HMD applications. The TIR prisms enable illumination light path in the display engine to be folded which can advantageously locate the center of gravity of the HMD display system or device closer to the user's head.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
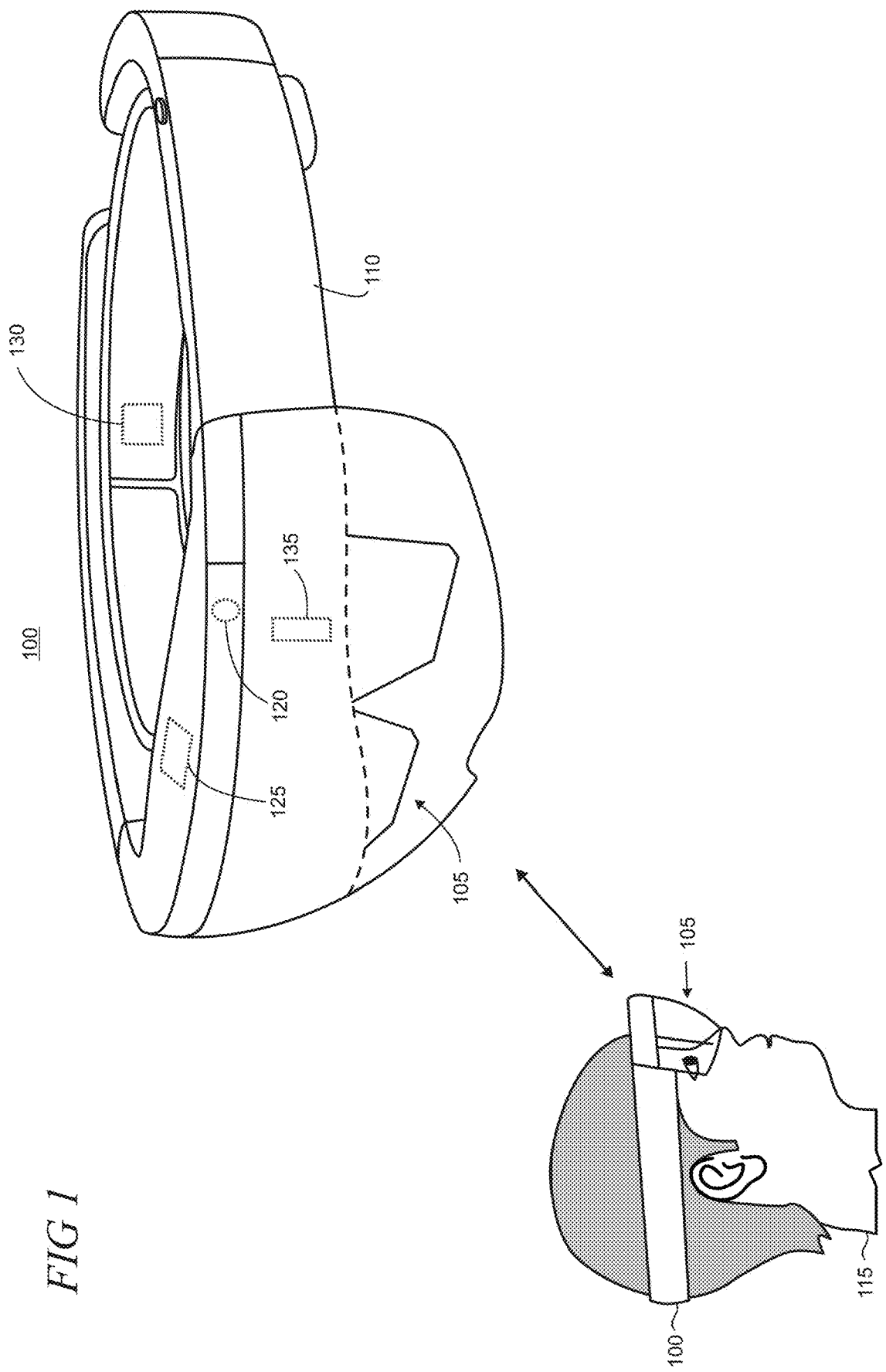
FIG. 1 shows a pictorial partially cutaway view of an illustrative HMD device that is configured with the present TIR prisms and use of backlight for LCoS (liquid crystal on silicon) microdisplay illumination.

FIG. 1 shows a pictorial partially cutaway view of an illustrative HMD device 100 that is configured with the present TIR prisms and use of backlight for LCoS microdisplay illumination. In this example, the HMD device includes a display device 105 and a frame 110 that wraps around the head of a user 115 to position the display device near the user's eyes to provide a virtual-reality or mixed-reality experience to the user.

Any suitable technology and configuration may be used to display images using the display device. For example, for a virtual-reality experience, the display device may be an opaque light-emitting diode (LED) display, a liquid crystal display (LCD), a micro-electromechanical system (MEMS) scanner display system, or any other suitable type of opaque display device. In some implementations, outward facing cameras 120 may be provided that capture images of the surrounding physical environment, and these captured images may be rendered on the display device 105 along with computer-generated virtual images that augment the captured images of the physical environment.

For a mixed-reality experience, the display device 105 may be see-through so that the user of the HMD device 100 can view physical, real-world objects in the physical environment over which pixels for virtual objects are overlayed. For example, the display device may include one or more partially transparent waveguides used in conjunction with a virtual image-producing imager or display engine such as, for example, a microdisplay comprising RGB (red, green, blue) LEDs, an organic LED (OLED) array, LCoS device, and/or MEMS device, or any other suitable displays or microdisplays operating in transmission, reflection, or emission. The imager may also include electronics such as processors, optical components such as mirrors and/or lenses, and/or mechanical and other components that enable a virtual display to be composed and provide one or more input optical beams to the display system. An illustrative embodiment of a display engine is described below in more detail in the text accompanying FIG. 4.

The frame 110 may further support additional components of the HMD device 100, including a processor 125, an inertial measurement unit (IMU) 130, and an eye tracker 135. The processor may include logic and associated computer memory configured to receive sensory signals from the IMU and other sensors, to provide display signals to the display device 105, to derive information from collected data, and to enact various control processes described herein.

The display device 105 may be arranged in some implementations as a near-eye display. In a near-eye display the imager does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display device are visible.

Figure 2:
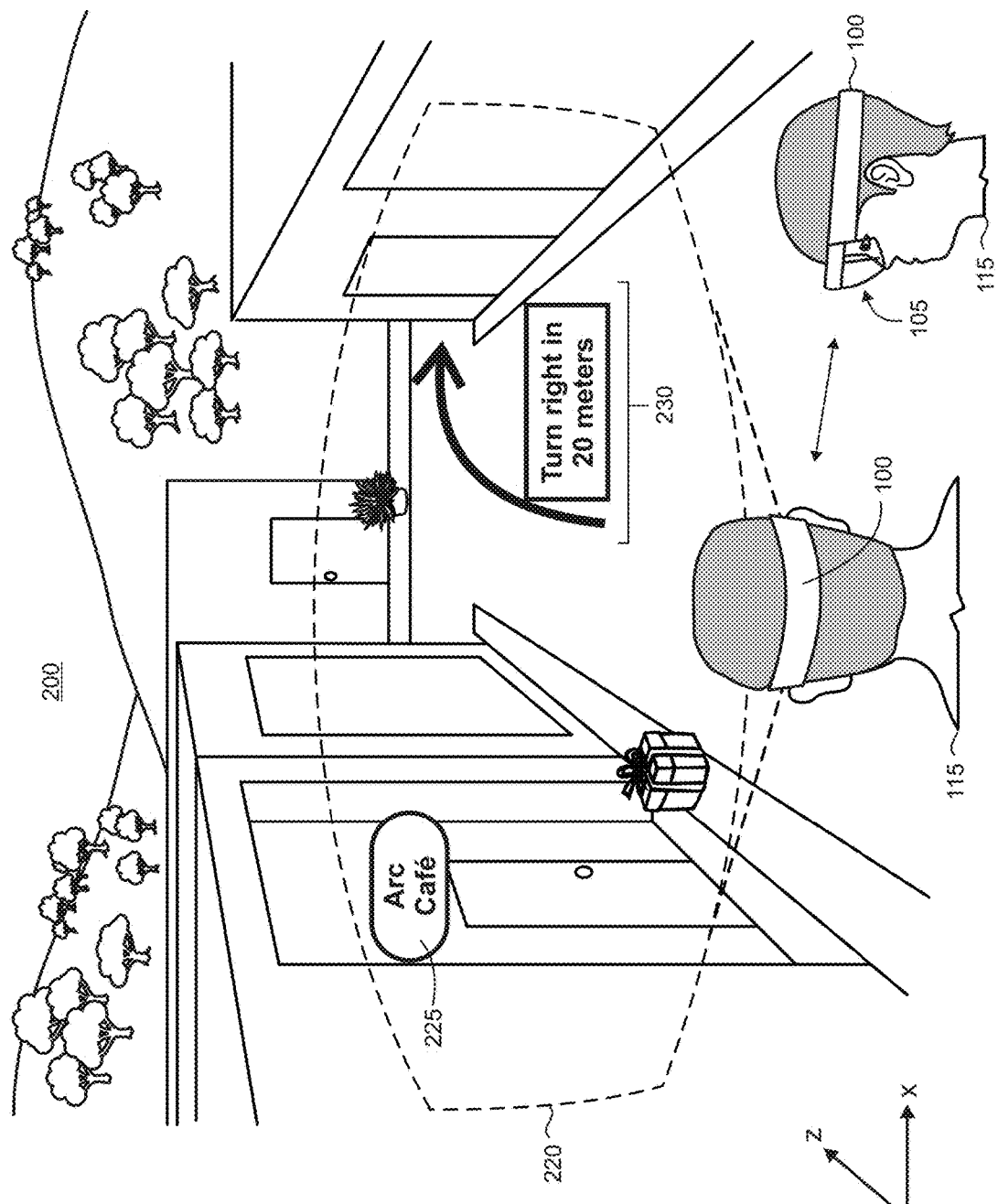
FIG. 2 illustratively shows virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display device 105 is configured as a near-eye display system having at least a partially transparent, see-through waveguide, among various other components. As noted above, a suitable display engine (not shown) generates virtual images that are guided by the waveguide in the display device to the user. Being see-through, the waveguide in the display device enables the user to perceive light from the real world.

The see-through waveguide-based display device 105 can render images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the images in the virtual world are not necessarily identical, as the virtual FOV provided by the display device is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters may include eye-box size, brightness, transparency and duty time, contrast, resolution, color fidelity, depth perception, size, weight, form-factor, and user comfort (i.e., wearable, visual, and social), among others.

In the illustrative example shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the virtual images include a tag 225 that identifies a restaurant business and directions 230 to a place of interest in the city. The mixed-reality environment 200 seen visually on the waveguide-based display device may also be supplemented by audio and/or tactile/haptic sensations produced by the HMD device in some implementations.

Figure 3:
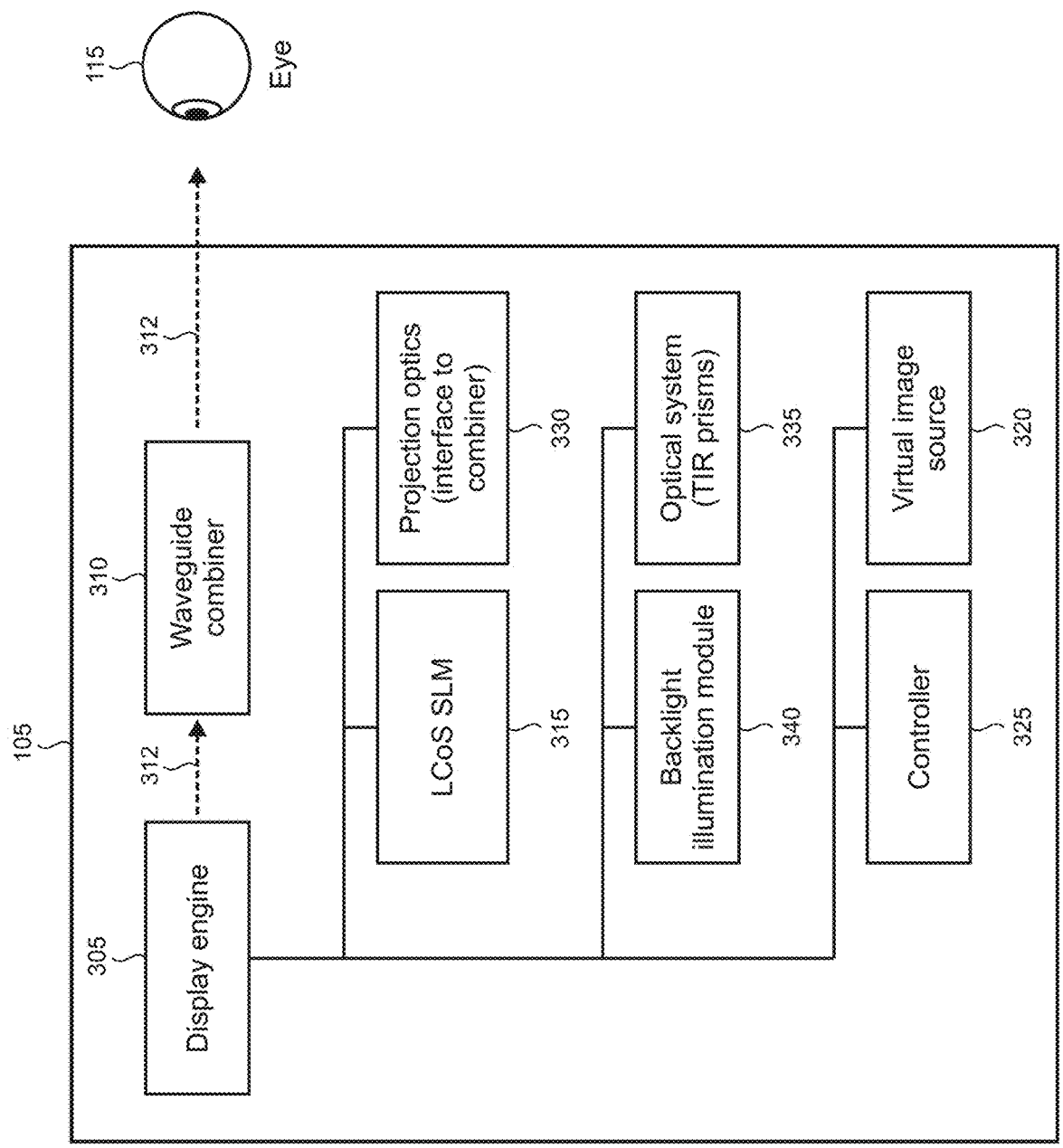
FIG. 3 shows illustrative components of a display device that may be utilized in an HMD device.

FIG. 3 shows illustrative components of the display device 105 that may be utilized in the HMD device in an illustrative mixed-reality embodiment. The display device includes a display engine 305 and a waveguide combiner 310 to provide virtual and real images to the user 115 over a light path 312.

As shown, the display engine 305 may include an LCoS SLM 315 that is arranged to provide virtual images from a source 320 to the waveguide combiner 310 responsively to instructions from a controller 325. Projection optics 330 may be utilized to manipulate or shape the virtual images, as needed, to support an optical interface between the display engine and the waveguide combiner. An optical system 335 comprising a pair of TIR (total internal reflection) prisms may be utilized to provide a light path from a backlight illumination module 340 to the LCoS SLM and further provide a folded virtual image projection path to the waveguide combiner (via the projection optics). The TIR prism pair in the field of optics are often referred to simply as "TIR prisms."

In an illustrative implementation, a waveguide in the waveguide combiner 310 and/or one or both the TIR prisms in the optical system 335 operates using a principle TIR so that light can be coupled among the various optical elements in the HMD device 100 (FIG. 1). TIR is a phenomenon which occurs when a propagating light wave strikes a medium boundary (e.g., as provided by the optical substrate of a waveguide or prism) at an angle larger than the critical angle with respect to the normal to the surface. In other words, the critical angle ($\theta_c$) is the angle of incidence above which TIR occurs, which is given by Snell's Law, as is known in the art. More specifically, Snell's law states that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 4:
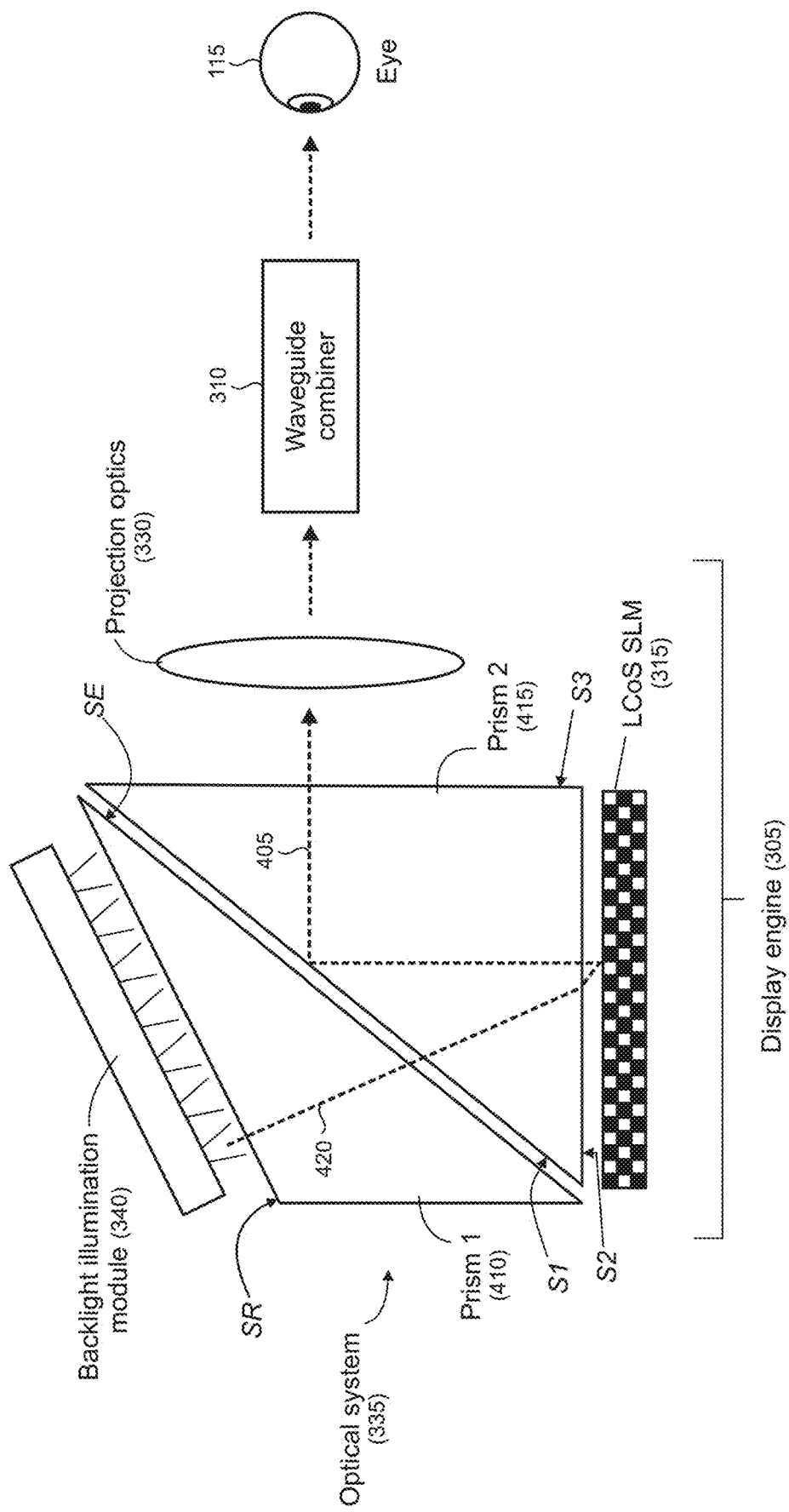
FIG. 4 shows an illustrative display engine and waveguide combiner.

FIG. 4 shows illustrative details of the display engine 305 that is configured to optically interface with the waveguide combiner 310 through projection optics 330 to provide virtual images from the LCoS SLM 315 to the user 115 over a folded projection path 405. The projection optics may include optical elements such as lenses, mirrors, filters, gratings, and the like, and may further include mechanical elements such as MEMS devices. An illustrative embodiment of the waveguide combiner 310 is described in more detail below in the text accompanying FIG. 14.

The LCoS SLM 315 may be conventionally configured to enable modulation, at any point on its surface, through a local change of the optical path, the intensity, phase, or polarization of an incident light beam from the backlight illumination module 340. The LCoS SLM operates in reflection to thereby propagate the illumination light twice through the modulating layer which, in turn, typically increases the dynamic range. LCoS SLMs are microdisplays that comprise a layer of nematic liquid crystals disposed between a transparent electrode and a matrix of CMOS (complementary metal oxide semiconductor) integrated circuitry on a silicon backplane. A reflective treatment may be deposited on the CMOS matrix. Anchoring layers on one side of the electrode and on the reflective layer enable the liquid crystal molecules to be oriented in a direction parallel to the surface. An electric field maintained between the transparent electrode and the semiconductor controls the local average molecular orientation of the liquid crystal and modulates its refractive index.

The optical system 335 comprises a set of prisms 410 and 415 that are referred to as "TIR prisms" as they utilize the TIR function to enable a folded path (indicated by reference numeral 420) for light propagating through the optical system from the backlight illumination module 340 to the LCoS SLM 315 which is then projected to the waveguide combiner 310, as shown. The prisms may be laminated and/or utilize an air gap, as shown in the drawing (which is exaggerated for the sake of clarity and is not intended to be limiting).

In this particular illustrative embodiment, the first prism 410 has a receiving surface SR and an exiting surface SE while the second prism 415 has three surfaces S1, S2, and S3, as shown. Thus, the light path 420 through the prism pair comprises refraction followed by TIR. However, it may be appreciated that the prisms in the optical system 335 can be alternatively arranged with different combinations of surfaces and light paths such that TIR can be performed first, followed by refraction, and that the backlight illumination module 340, LCoS SLM 315, and projection optics 330 can be arranged in spatial relationships other than shown, as may be needed to meet particular implementation requirements.

Figure 5:
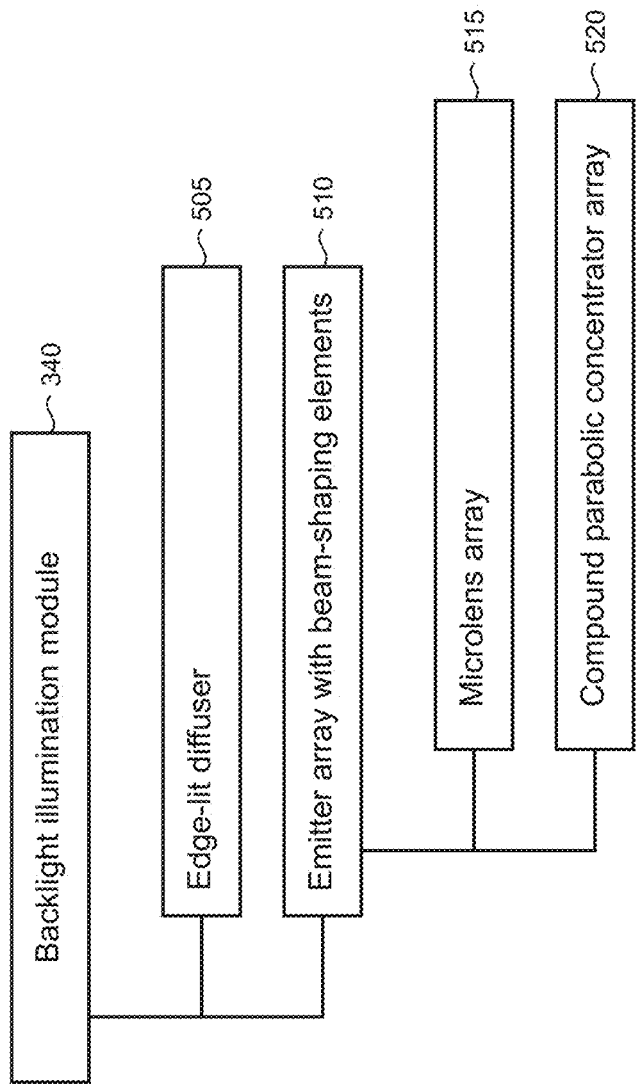
FIG. 5 shows illustrative embodiments for a backlight illumination module that may be utilized to illuminate an LCoS SLM microdisplay.

FIG. 5 shows illustrative embodiments for the backlight illumination module 340 that may be utilized to illuminate an LCoS SLM. A first embodiment includes an edge-lit diffuser 505. The second embodiment includes an array of emitters with beam-shaping elements 510. The beam-shaping elements include a microlens array 515 and a compound parabolic concentrator array 520. The two embodiments are discussed in more detail below.

Figure 6:
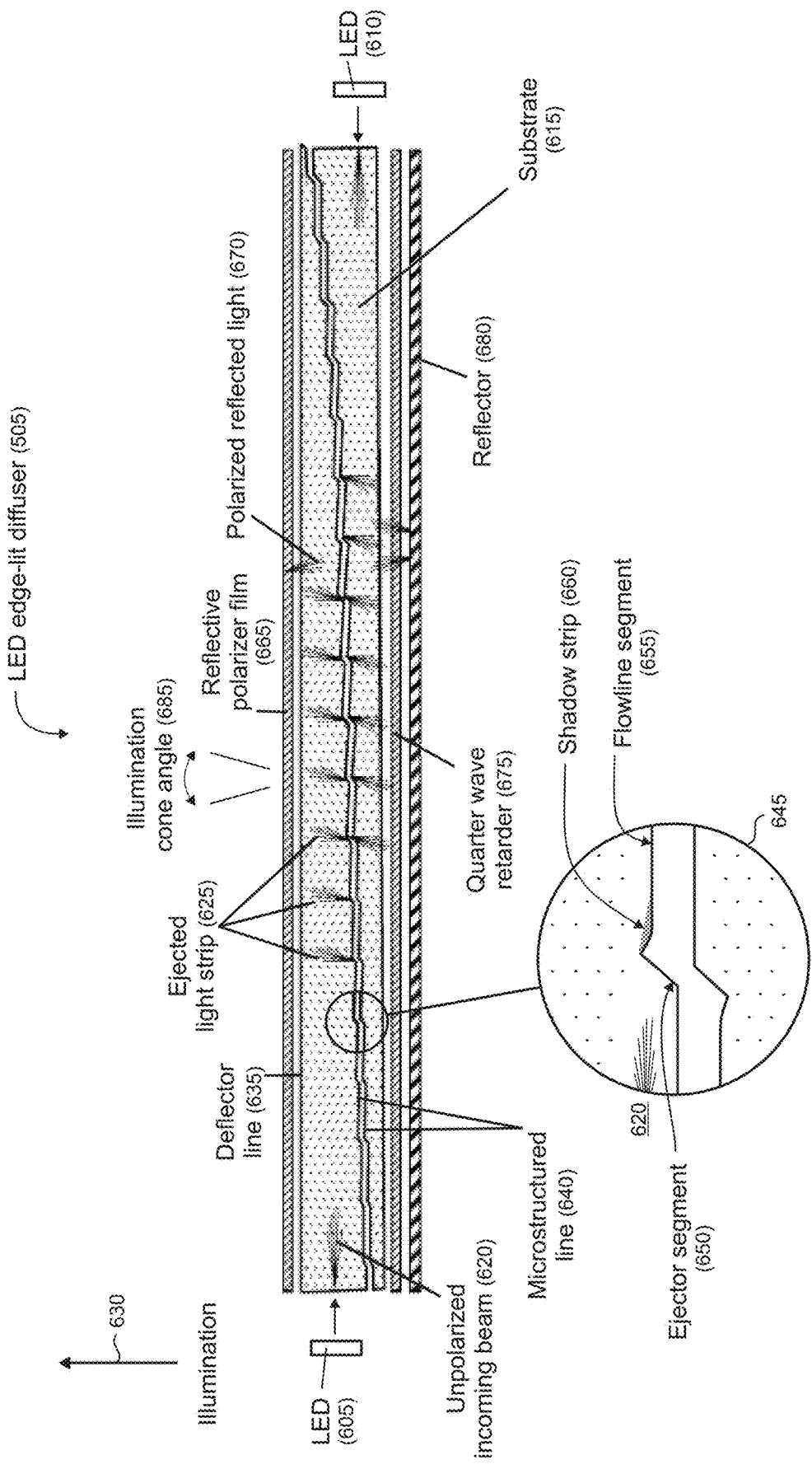
FIG. 6 shows a side cutaway view of an illustrative LED (light emitting diode) edge-lit diffuser.

FIG. 6 shows a side cutaway view of an illustrative LED edge-lit diffuser 505. In this particular example, LEDs 605 and 610 are positioned on the left and right edges of a diffuser substrate 615 that is at least partially transparent. Each LED is configured to inject an unpolarized incoming beam (as representatively indicated by reference numeral 620) into the diffuser substrate in a double injection configuration. In alternative implementations, the diffuser can be suitably adapted to receive light from a single edge LED in a single injection configuration, and/or non-LED light sources may be utilized.

The diffuser is configured with a series of small notches to operate as a beam expander that slices the incoming beam to small light ribbons or strips which are ejected over an emission area that extends from left to right in the drawing. The light strips are ejected normal to the planar surface of the diffuser, as indicated by reference numeral 625 (the illumination direction is upwards in the drawing, as indicated by arrow 630). The cross section of the diffuser 505 is bounded by the side entrances through which incoming beams enter, a deflector line 635, and a microstructured line 640. In an illustrative example, the refractive index is about 1.5 inside the boundaries, and about 1 outside them.

As shown, in this illustrative embodiment in which LEDs 605 and 610 provide edge light from the left and right diffuser edges in the double injection configuration, there are two microstructured lines 640 present. In the single injection configuration noted above, a single microstructured line would be utilized. As shown in the enlarged view 645, a microstructured line includes an ejector segment 650 and a flowline segment 655.

As the incoming beam 620 is sliced, there are alternating shadow strips 660 along the emission area of the diffuser 505. These shadow strips may be typically much wider than the light strips 625 and can be used to recycle undesired polarized light in the diffuser. The ejected light strips are slightly tilted with respect to the normal of a reflective polarizer film 665 that is placed over an exit aperture of the diffuser. Because an ejected light strip is slightly tilted, the unwanted reflected polarized light 670 encounters a shadow strip when it crosses back over the microstructured line 640. This enables the light to propagate in the diffuser and cross a quarter wave retarder 675 and impinge on a reflector 680. The reflected light has a desired polarization state which propagates through the shadow strips. As a result, the undesired polarized light is effectively recycled, and the number of light strips is doubled.

The configuration of the ejector 650 and flowline 655 segments can be adapted in the diffuser 505 to provide an illumination cone angle for emitted illumination light, as indicated by reference numeral 685, that meets beam-shaping requirements for a given display engine implementation. As the diffuser provides for relatively expansive emission, substantially uniform illumination of LCoS SLM 315 (FIGS. 3 and 4) may be achieved.

Figure 7:
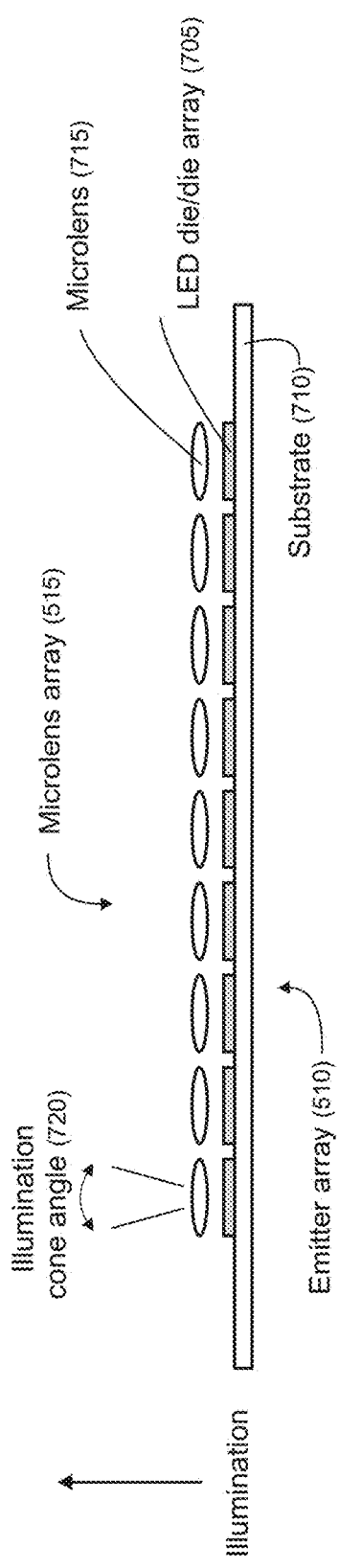
FIG. 7 shows an illustrative array of LED emitters with which beam shaping is implemented using an array of microlenses.

FIG. 7 shows a second illustrative embodiment for the backlight illumination module which employs an array of emitters 510, for example comprising micro- or mini-LEDs, with which beam shaping is implemented using an array of microlenses 515, (i.e., a microlenticular array or lenslet array). The array of LED emitters comprises a plurality of LED dies 705 (or die arrays in some alternative implementations) that are typically disposed on a substrate 710 to provide a desired spatial orientation for the LED emitters and suitable electrical and control signal connections.

The microlens array 515 comprises a plurality of individual microlenses 715 that are configured to provide a suitable illumination cone angle 720 as appropriate to provide substantially uniform illumination of the LCoS SLM 315 (FIGS. 3 and 4) using the TIR prism combination, as described above. The microlenses can be fixed or tunable in some cases. There is not necessarily a one-to-one correspondence between microlenses and LED dies/die arrays in typical implementations.

Figure 8:
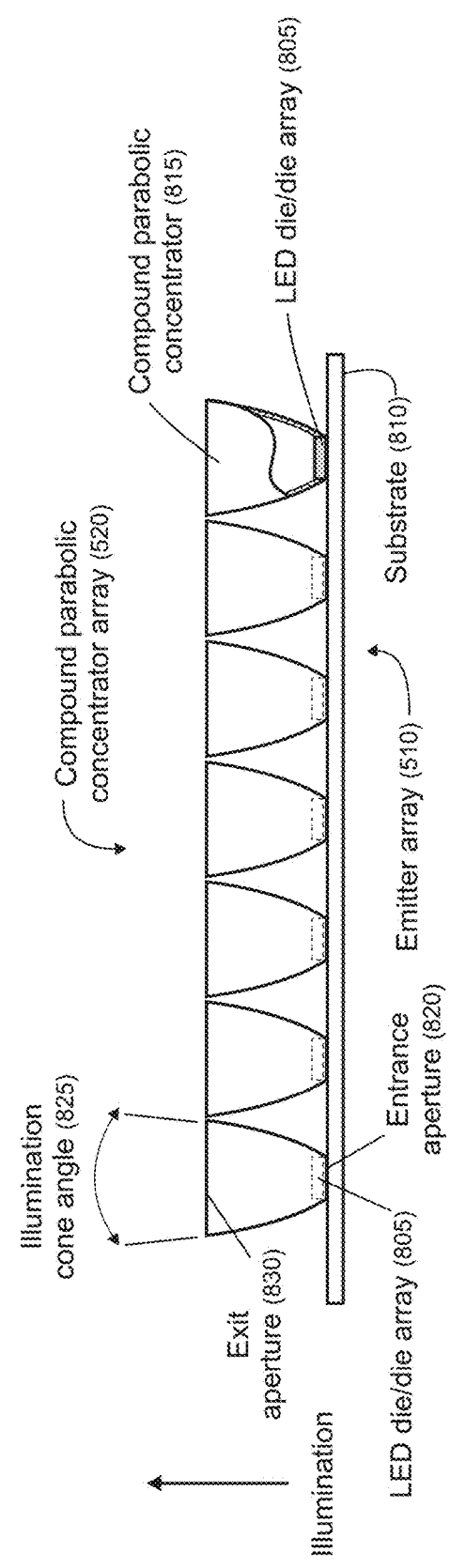
FIG. 8 shows an illustrative array of LED emitters with which beam shaping is implemented using an array of compound parabolic concentrators.

FIG. 8 shows a second illustrative embodiment for the backlight illumination module which employs an array of emitters 510, for example comprising micro- or mini-LEDs, that are located on a substrate 810 and with which beam shaping is alternatively implemented using an array of compound parabolic concentrators 520. As shown in the cutaway view on the right side of the drawing, an LED die 805 or die array is disposed at an entrance aperture 820 of each compound parabolic concentrator (representatively indicated by reference numeral 815).

A compound parabolic concentrator 815 includes a rotated compound parabolic profile to provide high collection efficiency of optical energy from the LED die 805. A diverging illumination pattern described by the illumination cone angle 825 at an exit aperture 830 may be defined by the physical characteristics of the concentrator.

Figure 9:
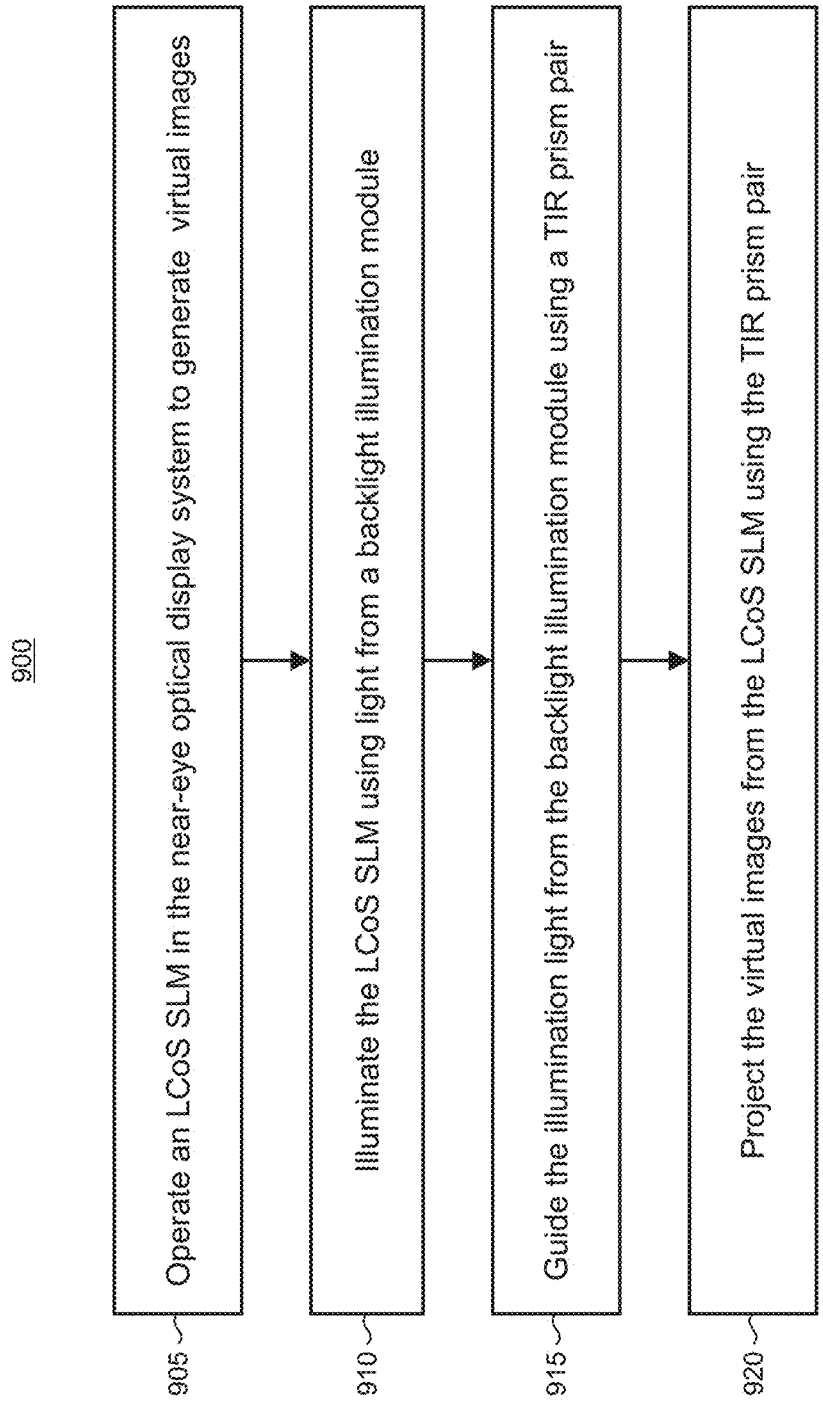
FIG. 9 is a flowchart of an illustrative method.

FIG. 9 is a flowchart 900 of an illustrative method for operating a near-eye optical display system to display virtual images within an FOV. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 905, an LCoS SLM in the near-eye optical display system is operated to generate the virtual images. At block 910, the LCoS SLM is illuminated using light from a backlight illumination module. At block 915, the illumination light from the backlight illumination module is guided using a total internal reflection (TIR) prism pair. At block 920, the virtual images are projected from the LCoS SLM using the TIR prism pair.

Figure 10:
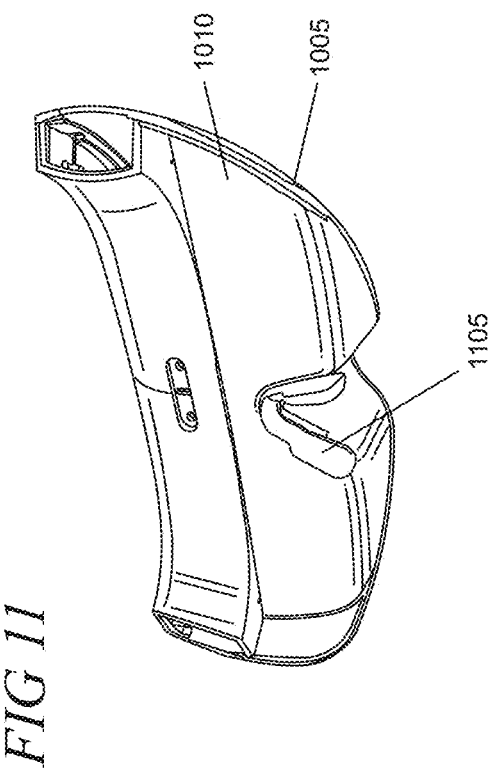
FIG. 10 shows a pictorial front view of an illustrative sealed visor that may be used as a component of an HMD device.
Figure 11:
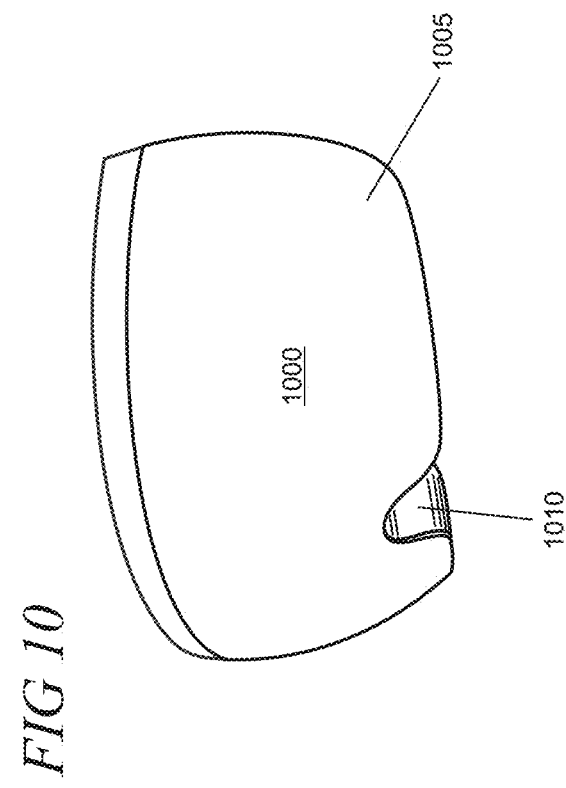
FIG. 11 shows a pictorial rear view of an illustrative sealed visor.

FIGS. 10 and 11 show respective front and rear views of an illustrative example of a visor 1000 that incorporates an internal near-eye display device 105 (FIGS. 1 and 2) that is used in the HMD device 100 as worn by a user 115. The visor, in some implementations, may be sealed to protect the internal display device. The visor typically interfaces with other components of the HMD device such as head-mounting/retention systems and other subsystems including sensors, power management, controllers, etc., as illustratively described in conjunction with FIGS. 15 and 16. Suitable interface elements (not shown) including snaps, bosses, screws, and other fasteners, etc. may also be incorporated into the visor.

Figure 12:
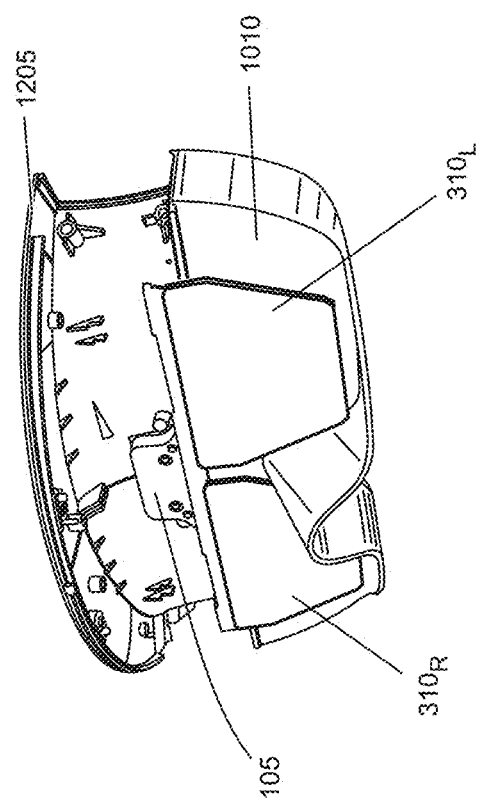
FIG. 12 shows a partially disassembled view of an illustrative sealed visor.

The visor 1000 may include see-through front and rear shields, 1005 and 1010 respectively, that can be molded using transparent or partially transparent materials to facilitate unobstructed vision to the display device and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 1205 shown in the disassembled view in FIG. 12.

The sealed visor 1000 can physically protect sensitive internal components, including the display device 105, when the HMD device is operated and during normal handling for cleaning and the like. The display device in this illustrative example includes left and right waveguide combiners 310L and 310R that respectively provide virtual images to the user's left and right eyes for mixed- and/or virtual-reality applications. The visor can also protect the display device from environmental elements and damage should the HMD device be dropped or bumped, impacted, etc.

Figure 14:
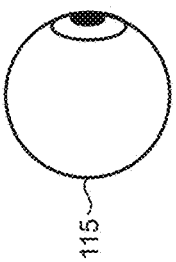
FIG. 14 shows a simplified side view of an illustrative virtual display system that includes a waveguide-based optical combiner that may be used in an HMD device.

As shown in FIG. 11, the rear shield 1010 is configured in an ergonomically suitable form 1105 to interface with the user's nose, and nose pads and/or other comfort features can be included (e.g., molded-in and/or added-on as discrete components). In some applications, the sealed visor 1010 can also incorporate some level of optical diopter curvature (i.e., eye prescription) within the molded shields in some cases. The sealed visor 1000 can also be configured to incorporate a conjugate lens pair as shown in FIG. 14 and described in the accompanying text.

Figure 13:
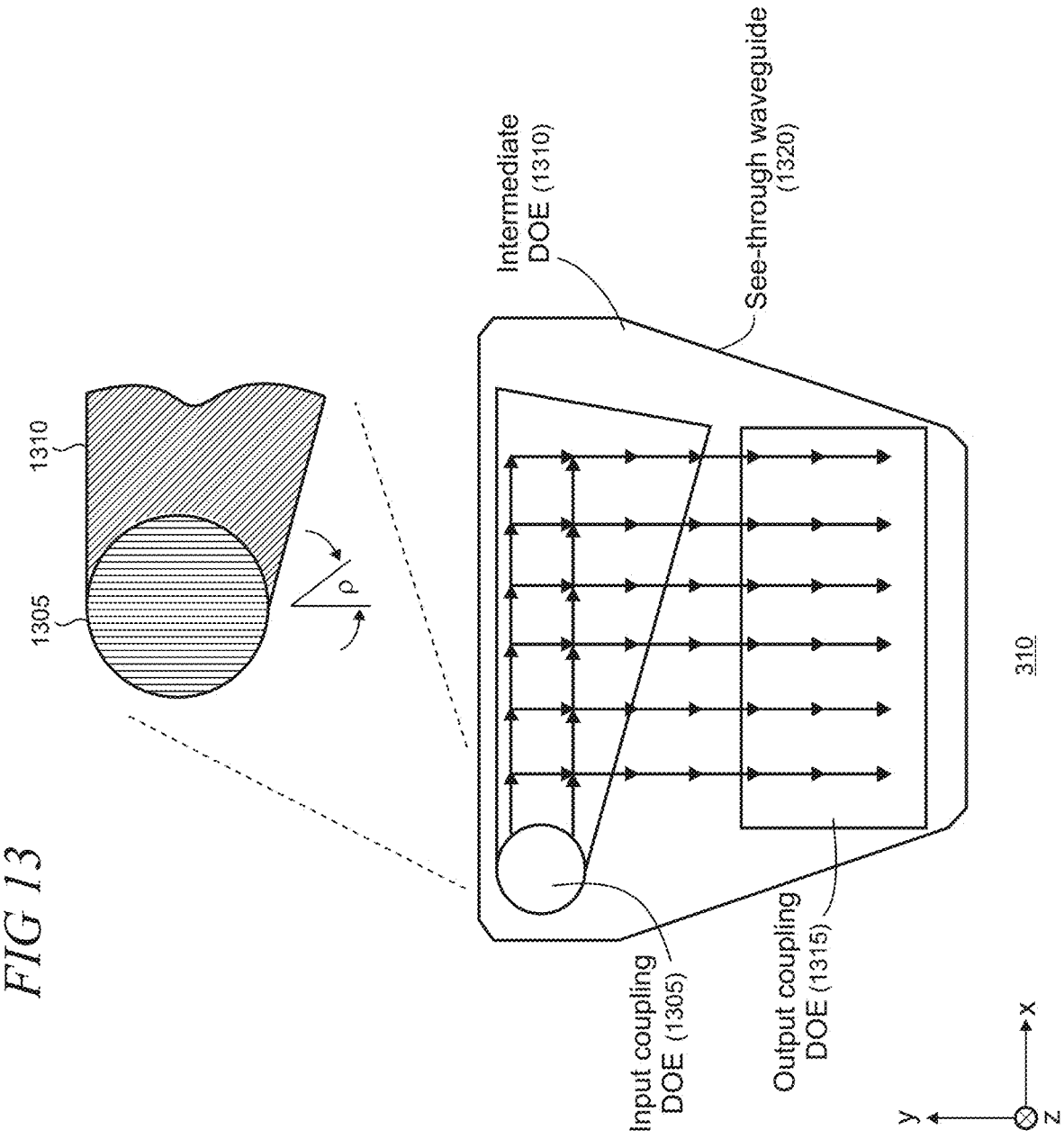
FIG. 13 shows an illustrative arrangement of diffractive optical elements (DOEs) configured for in-coupling, exit pupil expansion in two directions, and out-coupling.

FIG. 13 shows an illustrative waveguide combiner 310 having multiple diffractive optical elements (DOEs) that may be used in an embodiment of the display device 105 (FIG. 1) to provide input coupling, expansion of the exit pupil in two directions, and output coupling of virtual images from the display engine 305 (FIG. 3) to the user's eye. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide combiner 310 includes an input coupling DOE 1305, an output coupling DOE 1315, and an intermediate DOE 1310 that couples light between the input coupling and output coupling DOEs. The input coupling DOE is configured to couple image light comprising one or more imaging beams from the display engine into the waveguide 1320. The intermediate DOE expands the exit pupil in a first direction along a first coordinate axis (e.g., horizontal), and the output coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the input coupling DOE and the intermediate DOE as shown. As the light propagates in the intermediate DOE (horizontally from left to right in the drawing), it is also diffracted (in the downward direction) to the out-coupling DOE.

While DOEs are shown in this illustrative example using a single in-coupling DOE disposed to the left of the intermediate DOE 1310, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation. In other implementations of the present TIR prisms and backlight for LCoS microdisplay illumination, optical components operating in reflection may be utilized for one or more of input coupler, intermediate coupler, or output coupler.

FIG. 14 shows a simplified side view of an illustrative virtual display system 1400 that is incorporated into the display device 105 (FIG. 1) and which may be used in the HMD device 100 to render virtual images. The virtual display system may function as an optical combiner by superimposing the rendered virtual images over the user's view of light from real-world objects 1405 to thus form the mixed-reality display.

The display system includes at least one partially transparent (i.e., see-through) waveguide 1320 that is configured to propagate visible light. While a single waveguide is shown in FIG. 14 for sake of clarity in exposition of the present principles, it will be appreciated that a plurality of waveguides may be utilized in some applications. For example, three waveguides may be utilized in which a single waveguide supports each color component in an RGB (red, green, blue) color space.

The waveguide 1320 facilitates light transmission between the virtual image source and the eye. One or more waveguides can be utilized in the near-eye display system because they are transparent and because they are generally small and lightweight. This is desirable in applications such as HMD devices where size and weight are generally sought to be minimized for reasons of performance and user comfort. Use of the waveguide 1320 can enable the virtual image source to be located out of the way, for example, on the side of the user's head or near the forehead, leaving only a relatively small, light, and transparent waveguide optical element in front of the eyes.

The user 115 can look through the waveguide 1320 to see real-world objects on the real-world side of the display device 105 (the real-world side is indicated by reference numeral 1412 in FIG. 14). For the virtual part of the FOV of the display system, virtual image light 1415 is provided by the display engine 305. The virtual image light is in-coupled to the waveguide by an input coupler 1305 and propagated through the waveguide in total internal reflection. The image light is out-coupled from the waveguide by an output coupler 1315. The combination of see-through waveguide and coupling elements may be referred to as a mixed-reality optical combiner because it functions to combine real-world and virtual-world images into a single display.

Typically, in such waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. The collimated inputs and outputs in conventional waveguide-based display systems provide virtual images displayed by the display device that are focused at infinity.

In some embodiments, the input coupler 1425 and output coupler 1430 may be configured as diffractive optical elements (DOEs). DOEs may comprise, for example, surface relief grating (SRG) structures and volumetric holographic grating (VHG) structures. An intermediate DOE (not shown) may also be disposed in the light path between the input coupler and output coupler in some cases. The intermediate DOE may be configured to provide exit pupil expansion in one direction (e.g., horizontal) while the output coupler may be configured to provide exit pupil expansion in a second direction (e.g., vertical).

In alternative embodiments, the optical combiner functionality provided by the waveguide and DOEs may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element.

In other embodiments, the principles of the present TIR prisms and use of backlight for LCoS microdisplay illumination may be implemented using a reflective waveguide combiner having wavelength-sensitive reflective coatings with any suitable in-coupling and/or out-coupling methods. A reflective waveguide combiner may utilize a single waveguide in some implementations for all colors in the virtual images which may be desirable in some applications. By comparison, diffractive combiners typically require multiple waveguides to meet a target FOV in polychromatic applications due to limitations on angular range that are dictated by the waveguide TIR condition.

The present TIR prisms and use of backlight for LCoS microdisplay illumination may also be utilized with various other waveguide/coupling configurations beyond reflective and diffractive. For example, it may be appreciated that the principles of the present invention may be alternatively applied to waveguides that are refractive, polarized, hybrid diffractive/refractive, phase multiplexed holographic, and/or achromatic metasurfaces.

A negative lens 1435 is located on the eye side of the waveguide 1320 (the eye side is indicated by reference numeral 1414 in FIG. 14). The negative lens acts over the entire extent of the eyebox associated with the user's eye to thereby create the diverging rays 1440 from the collimated rays 1445 that exit the output coupler 1430. When the display engine 305 is operated to project virtual images that are in-coupled into the waveguide 1320, the output diverging rays present the virtual images at a predetermined focal depth, d, from the display system at an apparent or virtual point of focus, F. For example, if the negative lens is configured with −0.5 diopters of optical power, then d is equal to 2 m.

To ensure that the user's view of the real world remains unperturbed by the negative lens, a conjugate positive (i.e., convex) lens 1450 is located on the real-world side of the waveguide 1320 to compensate for the impact of the negative lens on the eye side. The conjugate pair of positive and negative lenses may be referred to as a push-pull lens pair in some contexts. In some applications, the functionality of the negative lens may be provided by a discrete standalone optical element. In other applications, one or more of the elements in the display device may be configured to incorporate the negative lens as an additional functionality. For example, the negative lens functionality can be integrated into the output coupler and/or waveguide in the display device using any suitable technique.

Different amounts of optical power may be utilized to provide for focal planes that are located at other distances to suit requirements of a particular application. The power of the negative lens 1435 does not affect the zeroth diffraction order that travels in TIR down the waveguide 1320 (i.e., from top to bottom in the drawings), but instead only the diffracted out-coupled field. In addition, the see-through field is not affected by the negative lens because whatever portion of the see-through field that is diffracted by the output coupler 1430 is trapped by TIR in the waveguide and is therefore not transmitted to the user's eye.

Figure 15:
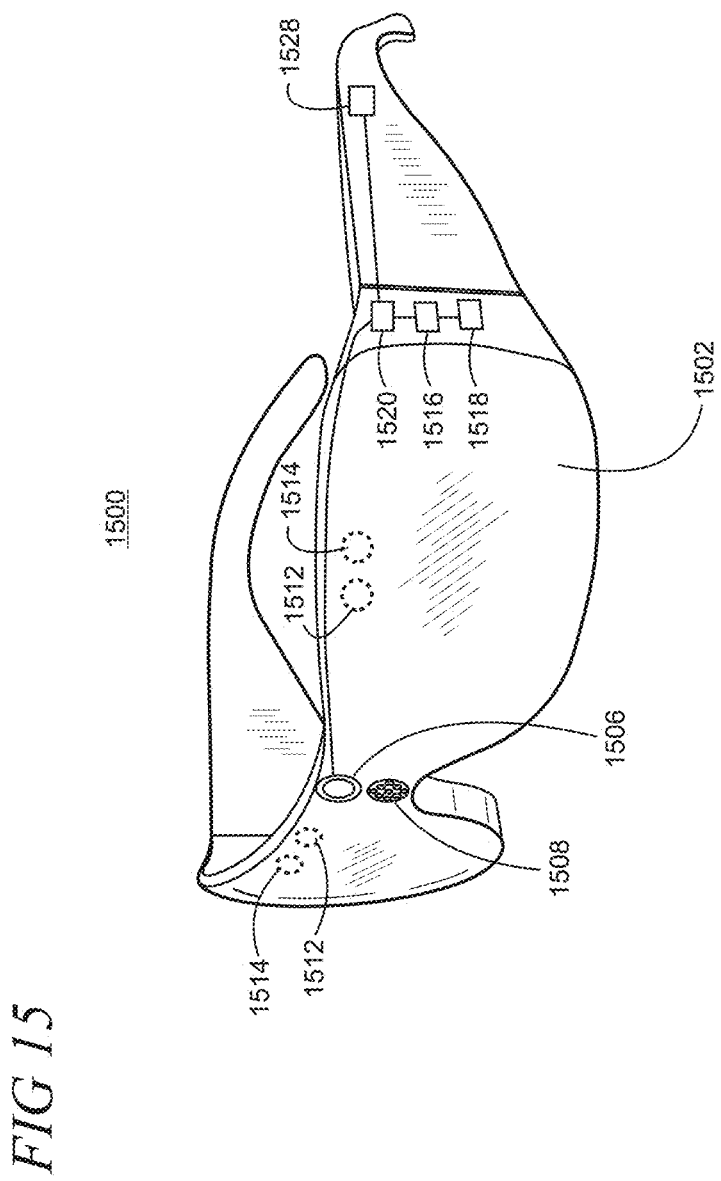
FIG. 15 is a pictorial view of an illustrative example of a virtual-reality or mixed-reality HMD device that may use the present TIR prisms and use of backlight for LCoS microdisplay illumination.
Figure 16:
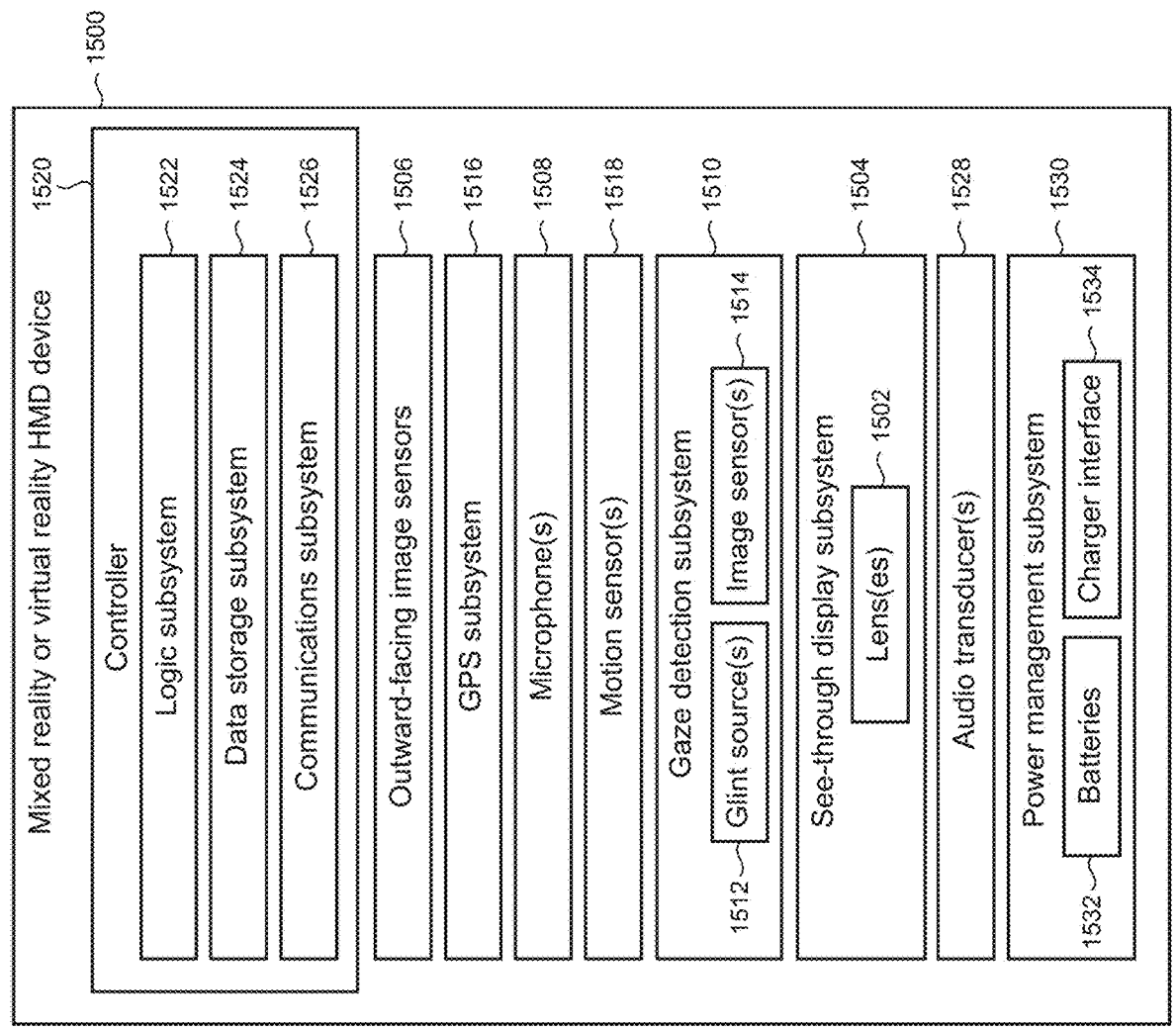
FIG. 16 shows a block diagram of an illustrative example of a virtual-reality or mixed-reality HMD device that may use the present TIR prisms and use of backlight for LCoS microdisplay illumination.

As noted above, the present TIR prisms and use of backlight for LCoS microdisplay illumination may be utilized in mixed- or virtual-reality applications. FIG. 15 shows one particular illustrative example of a mixed-reality HMD device 1500, and FIG. 16 shows a functional block diagram of the device 1500. The HMD device 1500 provides an alternative form factor to the HMD device 100 shown in FIGS. 1, 2, and 10-12. HMD device 1500 comprises one or more lenses 1502 that form a part of a see-through display subsystem 1504, so that images may be displayed using lenses 1502 (e.g., using projection onto lenses 1502, one or more waveguide systems, such as a near-eye display system, incorporated into the lenses 1502, and/or in any other suitable manner).

HMD device 1500 further comprises one or more outward-facing image sensors 1506 configured to acquire images of a background scene and/or physical environment being viewed by a user and may include one or more microphones 1508 configured to detect sounds, such as voice commands from a user. Outward-facing image sensors 1506 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 1500 may further include a gaze detection subsystem 1510 configured for detecting a direction of gaze of each eye of a user or a direction or location of focus, as described above. Gaze detection subsystem 1510 may be configured to determine gaze directions of each of a user's eyes in any suitable manner. For example, in the illustrative example shown, a gaze detection subsystem 1510 includes one or more glint sources 1512, such as virtual IR light or visible sources as described above, that are configured to cause a glint of light to reflect from each eyeball of a user, and one or more image sensors 1514, such as inward-facing sensors, that are configured to capture an image of each eyeball of the user. Changes in the glints from the user's eyeballs and/or a location of a user's pupil, as determined from image data gathered using the image sensor(s) 1514, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 1510 may have any suitable number and arrangement of light sources and image sensors. In some implementations, the gaze detection subsystem 1510 may be omitted.

The HMD device 1500 may also include additional sensors. For example, HMD device 1500 may comprise a global positioning system (GPS) subsystem 1516 to allow a location of the HMD device 1500 to be determined. This may help to identify real-world objects, such as buildings, etc., that may be located in the user's adjoining physical environment.

The HMD device 1500 may further include one or more motion sensors 1518 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 1506. The use of motion data may allow changes in gaze direction to be tracked even if image data from outward-facing image sensor(s) 1506 cannot be resolved.

In addition, motion sensors 1518, as well as microphone(s) 1508 and gaze detection subsystem 1510, also may be employed as user input devices, such that a user may interact with the HMD device 1500 via gestures of the eye, neck and/or head, as well as via verbal commands in some cases. It may be understood that sensors illustrated in FIGS. 15 and 16 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 1500 can further include a controller 1520 such as one or more processors having a logic subsystem 1522 and a data storage subsystem 1524 in communication with the sensors, gaze detection subsystem 1510, display subsystem 1504, and/or other components through a communications subsystem 1526. The communications subsystem 1526 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1524 may include instructions stored thereon that are executable by logic subsystem 1522, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 1500 is configured with one or more audio transducers 1528 (e.g., speakers, earphones, etc.) so that audio can be utilized as part of a mixed-reality or virtual-reality experience. A power management subsystem 1530 may include one or more batteries 1532 and/or protection circuit modules (PCMs) and an associated charger interface 1534 and/or remote power interface for supplying power to components in the HMD device 1500.

It may be appreciated that the HMD device 1500 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 17:
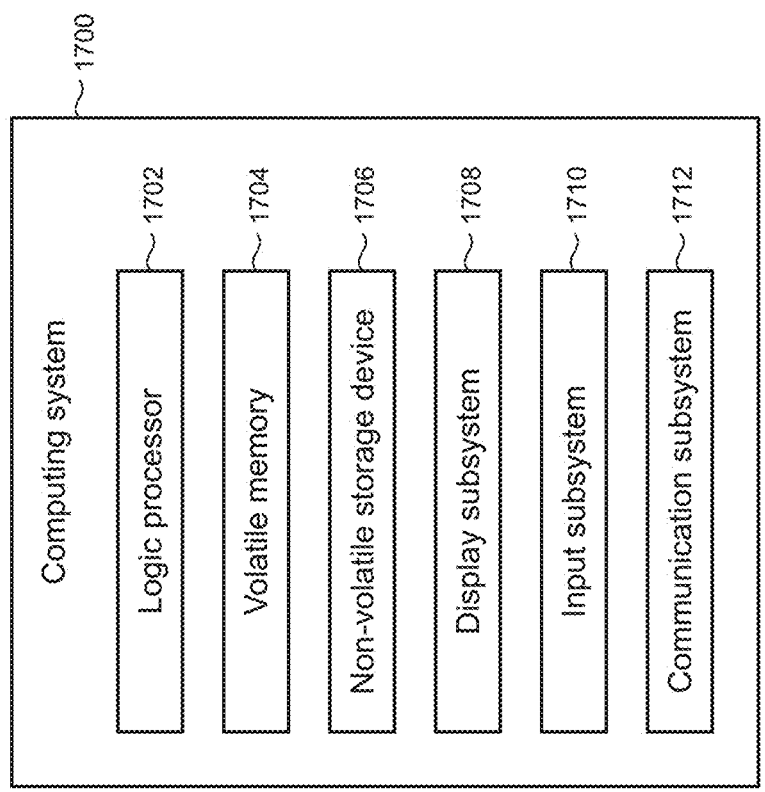
FIG. 17 schematically shows an illustrative example of a computing system that may use the present TIR prisms and use of backlight for LCoS microdisplay illumination.

FIG. 17 schematically shows an illustrative example of a computing system 1700 that can enact one or more of the methods and processes described above for the present TIR prisms and use of backlight for LCoS microdisplay illumination. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 1700 includes a logic processor 1702, volatile memory 1704, and a non-volatile storage device

1706. Computing system 1700 may optionally include a display subsystem 1708, input subsystem 1710, communication subsystem 1712, and/or other components not shown in FIG. 17.

Logic processor 1702 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 1706 includes one or more physical devices configured to hold instructions executable by the logic processors to implement the methods and processes described herein. When such methods and processes are implemented, the state of non-volatile storage device 1706 may be transformed—e.g., to hold different data.

Non-volatile storage device 1706 may include physical devices that are removable and/or built-in. Non-volatile storage device 1706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1706 may include nonvolatile, dynamic, static, read/write, read-only, sequential-access, location-addressable, file-addressable, and/or content-addressable devices. It will be appreciated that non-volatile storage device 1706 is configured to hold instructions even when power is cut to the non-volatile storage device 1706.

Volatile memory 1704 may include physical devices that include random access memory. Volatile memory 1704 is typically utilized by logic processor 1702 to temporarily store information during processing of software instructions. It will be appreciated that volatile memory 1704 typically does not continue to store instructions when power is cut to the volatile memory 1704.

Aspects of logic processor 1702, volatile memory 1704, and non-volatile storage device 1706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1700 typically implemented in software by a processor to perform a particular function using portions of volatile memory, which function involves transformative processing that specially configures the processor to perform the function. Thus, a program may be instantiated via logic processor 1702 executing instructions held by non-volatile storage device 1706, using portions of volatile memory 1704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 1708 may be used to present a visual representation of data held by non-volatile storage device 1706. This visual representation may take the form of a graphical user interface (GUI). As the herein described methods and processes change the data held by the non-volatile storage device, and thus transform the state of the non-volatile storage device, the state of display subsystem 1708 may likewise be transformed to visually represent changes in the underlying data. Display subsystem 1708 may include one or more display devices utilizing virtually any type of technology; however, one utilizing a MEMS projector to direct laser light may be compatible with the eye-tracking system in a compact manner. Such display devices may be combined with logic processor 1702, volatile memory 1704, and/or non-volatile storage device 1706 in a shared enclosure, or such display devices may be peripheral display devices.

When included, input subsystem 1710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1712 may be configured to communicatively couple various computing devices described herein with each other, and with other devices. Communication subsystem 1712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

Various exemplary embodiments of the present TIR prisms and use of backlight for LCoS microdisplay illumination are now presented by way of illustration and not as an exhaustive list of all embodiments. An example includes a display engine adapted for use with a head-mounted display (HMD) device, comprising: an LCoS (liquid crystal on silicon) spatial light modulator (SLM); a backlight illumination module configured to provide illumination to the LCoS SLM for projecting virtual holographic images for display by the HMD device; and a pair of TIR (total internal reflection) prisms configured to provide a folded light path for the LCoS SLM illumination, the folded light path comprising a refraction path and a TIR path.

In another example, the backlight illumination module comprises an edge-lit diffuser. In another example, the edge-lit diffuser includes at least one entrance to receive light from a light emitting diode (LED). In another example, the edge-lit diffuser is configured as a beam expander with polarization recycling. In another example, the backlight illumination module comprises an array of light emitting diodes (LEDs). In another example, the backlight illumination module further includes an array of microlenses configured for providing beam shaping to light emitted from the array of LEDs. In another example, the backlight illumination module further includes an array of compound parabolic concentrators configured for providing beam shaping to light emitted from the array of LEDs. In another example, the display engine is adapted for use with one of a virtual-reality display system or a mixed-reality display system. In another example, the refraction path is utilized for light from the backlight illumination panel to the LCoS SLM and the TIR path is utilized for virtual image light from the LCoS SLM.

A further example includes a head-mounted display (HMD) device wearable by a user and supporting a mixed-reality experience including viewing virtual images from a virtual world that are combined with real-world images of objects in a physical world, comprising: a see-through waveguide combiner through which the user can view the physical world and on which the virtual images are rendered within a field of view (FOV) of the HMD device; a liquid crystal on silicon (LCoS) spatial light modulator (SLM) for generating the virtual images that are rendered by the see-through waveguide combiner; a backlight illumination module; and a total internal reflection (TIR) prism pair configured for guiding light from the backlight illumination module to the LCoS SLM and for projecting the generated virtual images to the see-through waveguide combiner.

In another example, the HMD device further comprises projection optics that are configured to provide an optical interface to the see-through waveguide combiner to the projected virtual images from the TIR prisms. In another example, the see-through waveguide combiner comprises one or more waveguides that include an input coupler and an output coupler implemented using one of diffraction gratings or wavelength-sensitive reflective coatings, in which the input coupler is configured to in-couple one or more optical beams for the virtual images into the one or more waveguides and the output coupler is configured to out-couple the one or more optical beams for the virtual images from the one or more waveguides to an eye of the user, in which virtual images associated with the out-coupled beams are rendered within the FOV. In another example, the backlight illumination module comprises a diffuser that is edge lit by one or more light emitting diodes (LEDs). In another example, the backlight illumination module comprises an array of light emitting diode (LED) emitters and one or more beam-shaping elements. In another example, the one or more beam-shaping elements comprise one of microlens array or compound parabolic concentrator array.

A further example includes a method for operating a near-eye optical display system to display virtual images within a field of view (FOV), comprising: operating a liquid crystal on silicon (LCoS) spatial light modulator (SLM) in the near-eye optical display system to generate the virtual images; illuminating the LCoS SLM using light from a backlight illumination module; guiding the illumination light from the backlight illumination module using a total internal reflection (TIR) prism pair; and projecting the virtual images from the LCoS SLM using the TIR prism pair.

In another example, the method further includes configuring the backlight illumination module to provide substantially uniform illumination of the LCoS SLM using one or more beam-shaping elements. In another example, the beam-shaping elements comprise one of diffuser, microlens array, or compound parabolic concentrator array. In another example, the diffuser includes a microstructured line comprising alternating ejector and flow line segments that form a series of small notches that slice incoming light from a light source into alternating strips of light and shadow. In another example, the method further includes combining the projected virtual images from the LCoS SLM with light from real-world objects in a mixed-reality display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A head-mounted display (HMD) device wearable by a user and supporting a mixed-reality experience including viewing virtual images from a virtual world that are combined with real-world images of objects in a physical world, comprising:
    a see-through waveguide combiner through which the user can view the physical world and on which the virtual images are rendered within a field of view (FOV) of the HMD device;
    a liquid crystal on silicon (LCoS) spatial light modulator (SLM) for generating the virtual images that are rendered by the see-through waveguide combiner;
    a backlight illumination module; and
    a total internal reflection (TIR) prism pair configured for providing a folded light path from the backlight illumination module to the LCoS SLM and for projecting the generated virtual images to the see-through waveguide combiner, wherein the folded light path comprises a refraction path and a TIR path.

2. The HMD device of claim 1 further comprising projection optics that are configured to provide an optical interface to the see-through waveguide combiner to the projected virtual images from the TIR prisms.

3. The HMD device of claim 1 in which the see-through waveguide combiner comprises one or more waveguides that include an input coupler and an output coupler implemented using one of diffraction gratings or wavelength-sensitive reflective coatings, in which the input coupler is configured to in-couple one or more optical beams for the virtual images into the one or more waveguides and the output coupler is configured to out-couple the one or more optical beams for the virtual images from the one or more waveguides to an eye of the user, in which virtual images associated with the out-coupled beams are rendered within the FOV.

4. The HMD device of claim 1 in which the backlight illumination module comprises a diffuser that is edge lit by one or more light emitting diodes (LEDs).

5. The HMD device of claim 1 in which the backlight illumination module comprises an array of light emitting diode (LED) emitters and one or more beam-shaping elements.

6. The HMD device of claim 5 in which the one or more beam-shaping elements comprise one of microlens array or compound parabolic concentrator array.

* * * * *